(12) United States Patent
Sinatov

(10) Patent No.: US 10,655,913 B2
(45) Date of Patent: May 19, 2020

(54) METHOD FOR ENERGY STORAGE WITH CO-PRODUCTION OF PEAKING POWER AND LIQUEFIED NATURAL GAS

(71) Applicant: Stanislav Sinatov, Kiryat-Ono (IL)

(72) Inventor: Stanislav Sinatov, Kiryat-Ono (IL)

(*) Notice: Subject to any disclaimer, the term of this patent is extended or adjusted under 35 U.S.C. 154(b) by 104 days.

(21) Appl. No.: 15/696,182

(22) Filed: Sep. 6, 2017

(65) Prior Publication Data

US 2018/0073802 A1 Mar. 15, 2018

Related U.S. Application Data

(60) Provisional application No. 62/393,252, filed on Sep. 12, 2016.

(51) Int. Cl.
| | |
|---|---|
| *F25J 1/02* | (2006.01) |
| *F25J 1/00* | (2006.01) |
| *F01K 1/04* | (2006.01) |
| *F01K 25/06* | (2006.01) |
| *F02C 6/16* | (2006.01) |
| *F16T 1/00* | (2006.01) |

(52) U.S. Cl.
CPC .......... *F25J 1/0236* (2013.01); *F01K 1/04* (2013.01); *F01K 25/06* (2013.01); *F02C 6/16* (2013.01); *F16T 1/00* (2013.01); *F25J 1/004* (2013.01); *F25J 1/0012* (2013.01); *F25J 1/0022* (2013.01); *F25J 1/0037* (2013.01); *F25J 1/0042* (2013.01); *F25J 1/0052* (2013.01); *F25J 1/023* (2013.01); *F25J 1/0221* (2013.01); *F25J 1/0224* (2013.01); *F25J 1/0232* (2013.01); *F25J 1/0251* (2013.01); *F25J 2205/02* (2013.01); *F25J 2210/06* (2013.01); *F25J 2210/40* (2013.01); *F25J 2210/60* (2013.01); *F25J 2220/66* (2013.01); *F25J 2220/68* (2013.01); *F25J 2230/30* (2013.01); *F25J 2260/60* (2013.01); *F25J 2270/06* (2013.01); *F25J 2270/14* (2013.01); *Y02E 60/15* (2013.01)

(58) Field of Classification Search
USPC ......... 62/611, 606, 612, 613, 614, 615, 640, 62/641, 642, 644, 645
See application file for complete search history.

(56) References Cited

U.S. PATENT DOCUMENTS

| | | | | |
|---|---|---|---|---|
| 1,574,119 | A | | 2/1926 | Seligmann |
| 3,645,106 | A | * | 2/1972 | Gaumer, Jr. ........... F25J 1/0022 62/612 |
| 3,657,898 | A | * | 4/1972 | Ness ........................ F01D 1/08 62/87 |
| 4,012,212 | A | * | 3/1977 | Kniel ..................... F25J 1/0022 62/621 |
| 4,054,433 | A | * | 10/1977 | Buffiere ................... F17C 9/04 62/643 |
| 4,192,662 | A | * | 3/1980 | Ogata ...................... F17C 9/04 62/643 |

(Continued)

*Primary Examiner* — Justin M Jonaitis

(57) ABSTRACT

A method for energy storage which integrates charging a liquid in an energy storage facility through consumption of a power from the grid with reduction pressure of natural gas through expander at the co-located city gate station and includes recovery of mechanical power of the natural gas expander and cold thermal energy of the expanded natural gas for an increase in production of liquid air per each kW of low-demand power consumed from the grid during off-peak hours.

4 Claims, 1 Drawing Sheet

(56) References Cited

U.S. PATENT DOCUMENTS

| | | | | |
|---|---|---|---|---|
| 4,329,842 A | * | 5/1982 | Hoskinson | F02C 3/00 60/39.465 |
| 4,357,153 A | * | 11/1982 | Erickson | B01D 3/007 203/24 |
| 4,437,312 A | * | 3/1984 | Newton | F01K 25/06 60/648 |
| 4,479,350 A | * | 10/1984 | Newton | F01K 25/06 60/648 |
| 4,711,093 A | | 12/1987 | Markbreiter | |
| 4,778,497 A | | 10/1988 | Hanson | |
| 4,894,076 A | | 1/1990 | Dobracki | |
| 4,920,749 A | | 5/1990 | Letarte | |
| 4,970,867 A | * | 11/1990 | Herron | F25J 1/0022 62/613 |
| 5,036,671 A | * | 8/1991 | Nelson | F25J 1/0022 62/48.2 |
| 5,141,543 A | * | 8/1992 | Agrawal | F17C 9/04 62/612 |
| 5,231,835 A | | 8/1993 | Beddome | |
| 5,392,605 A | | 2/1995 | Kaplan | |
| 5,425,230 A | | 6/1995 | Shpak | |
| 5,836,173 A | | 11/1998 | Lynch | |
| 6,131,407 A | * | 10/2000 | Wissolik | F25J 1/0012 62/606 |
| 6,230,518 B1 | | 5/2001 | Hahn | |
| 6,484,533 B1 | | 11/2002 | Allam | |
| 7,272,932 B2 | | 9/2007 | Watson | |
| 2003/0070432 A1 | | 4/2003 | Walpita | |
| 2003/0101728 A1 | * | 6/2003 | Wakana | F02C 6/14 60/727 |
| 2009/0293503 A1 | * | 12/2009 | Vandor | F01D 15/005 62/45.1 |
| 2014/0333139 A1 | * | 11/2014 | Vandor | B60L 50/10 307/69 |

* cited by examiner

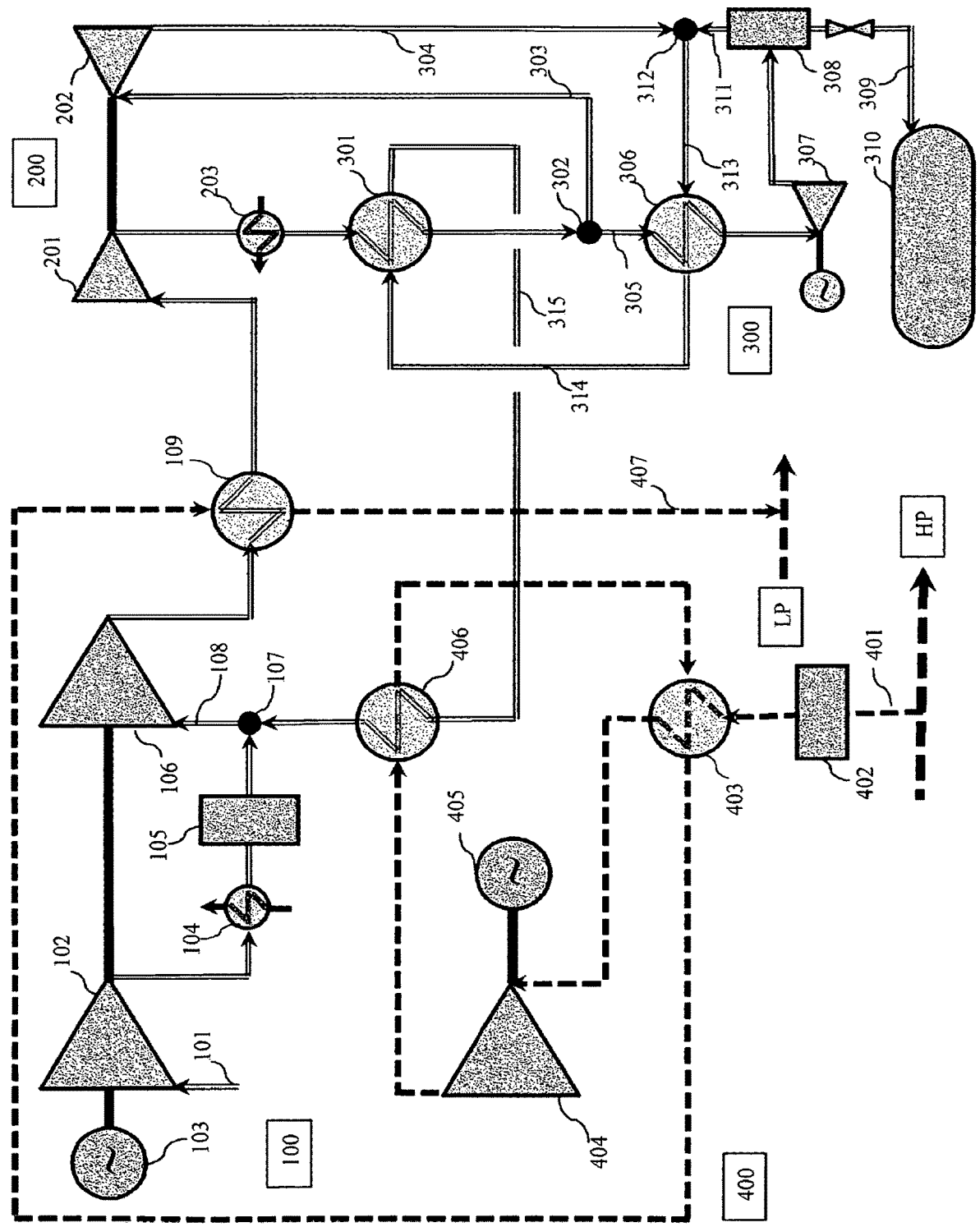

METHOD FOR ENERGY STORAGE WITH CO-PRODUCTION OF PEAKING POWER AND LIQUEFIED NATURAL GAS

CROSS-REFERENCE TO RELATED APPLICATIONS

This application claims the benefits of U.S. Provisional Application No. 62/393,252 filed on Sep. 12, 2016.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to the field of energy conversion technique, and more specifically to the methods enabling an improvement in the technologies intended for conversion and storage of a low-demand energy at the facilities co-located with the natural gas pressure reducing (city gate) stations. More particularly, the present invention relates to the methods making possible to profitably combine the operation of the small-scale liquid air energy storage and co-located city gate station.

BACKGROUND OF THE INVENTION

In modern times the electrical energy storages are becoming an integral part of the distribution grids, ensuring the on-demand and reliable supply of electricity by the intermittent renewable energy sources and providing a stable and efficient operation of the base-load fossil-fuel fired and nuclear power plants around the clock.

Amongst the known methods for energy storage able to accumulate a lot of energy and store it over a long time-period, the proposed method for Liquid Air Energy Storage (LAES) (see FR Pat. No. 2,489,411) is distinguished by a much simpler permitting process and the freedom from any geographical, land and environmental constraints, inherent in other known methods for large-scale energy storage technologies, like Pumped Hydro Electric Storage (PHES) and Compressed Air Energy Storage (CAES). In the LAES systems liquid air is produced using a low-demand power from the grid, stored in the small volume tanks between the off-peak and on-peak hours and re-gasified and used as an effective working medium for producing a peaking power in the periods of high demand for power. However, producing a liquid air during off-peak hours is an energy intensive process, wherein a great deal of power is consumed from the grid by the electrically-driven atmospheric and recirculating air compressors. Therefore, many technical solutions have been proposed for reducing the energy consumption and losses in this process providing eventually an increase in the LAES round-trip efficiency (RTE).

The installation of one or two booster compressors downstream of the mentioned electrically-driven compressors is one of such solutions, which is long- and widely-used in the gas liquefaction technique. The booster compressors are driven by the work-performing turbo-expanders, wherein a major part of the air pressurized by said booster compressors is expanded and in consequence of this deeply cooled. A cold thermal energy of the expanded air stream is used for cooling and liquefaction of another, minor part of said pressurized air stream, whereupon said expanded air stream is recycled to the inlet of the electrically-driven compressor. The examples of gas liquefaction system with one booster compressor can be found in the U.S. Pat. Nos. 1,574,119, 5,836,173, et al., whereas the systems with two booster compressors are described in the U.S. Pat. Nos. 4,778,497, 4,894,076, 5,231,835, 6,484,533, et al. An increase in number of the installed booster compressors makes possible to somewhat reduce an electric power consumed by the compressor train, but this reduction does not provide a desirable cardinal increase in the LAES RTE. For example, at the same liquefaction capacity of 1.25 t/h a specific power consumption of the micro-scale gas liquefier with one booster compressor described in the U.S. Pat. No. 6,230,518 is equal to 800 kWh/t, whereas in the standard nitrogen liquefier with two booster compressors produced by the Cosmodyne LLC power consumption is reduced to 632 kWh/t only. Therefore, keeping a possibility for an in increase in number of the installed booster compressors, there is a need to find a new way for a more significant decrease in power consumed from the grid during charging the LAES.

One of such ways could be co-location of the LAES with the natural gas (NG) pressure reducing (city gate) station and recovery of an available energy of the high-pressure (HP) gas being presently wasted in the throttling valves. Replacement of the throttling valves by the turbo-expanders which convert a kinetic energy of the motive NG stream into useful grid power is a well-known technology described in many patents and patent applications. Most of the technical solutions of this kind are intended for generation of the mechanical or electrical power only. In these cases, a thermal energy at a rate of ~3.5 kWth per each kW of additional mechanical power produced is usually consumed to provide the identical temperatures of the high-pressure (HP) and low-pressure (LP) gas streams at the inlet and outlet of the expander correspondingly. A thermal energy required for pre-heating the NG upstream of the expander is proposed to derive from combustion of a part of NG reduced in pressure (see e. c. U.S. Pat. Nos. 4,920,749 and 5,392,605), from the waste heat streams of co-located power or industrial facilities (see e. c. U.S. Pat. No. 5,425,230), or through converting a part of recovered electrical energy into a needed thermal one (see e. c. U.S. Pat. Appl. No. 2003/0070432). In so doing, there are not the known examples of converting the mechanical or electrical energy at the CG stations into a liquid air as an effective medium for storage of this energy and power from the grid during off-peak periods.

Recovering the mechanical or electrical energy at the CG stations may be supplemented by using a cold thermal energy of the LP NG stream outgoing from the expander for meeting the demands of the HVAC systems and commercial cold users. For these purposes, reduction in pressure of HP gas is performed with a moderate or without any pre-heating of this gas upstream of the expander. In the first case, an outlet temperature of LP gas is maintained at a level low enough for using this gas as a cold source in the air-conditioning systems, as it is described in the U.S. Pat. No. 7,272,932. In the second case, an outlet temperature of LP gas is maintained at a level significantly below 0° C. and may fall below a level of freezing the water components in gas stream. Therefore, a need for drying of HP NG stream upstream of the expander is determined with regard to a designed temperature of the LP gas and a water vapor content in HP gas. If the bulk or sole source of HP gas in the main pipeline is the NG from the LNG regasification terminal, the expansion of this gas may be performed without its pre-drying. Otherwise, lowering a temperature level of freezing the water components in gas stream or removal of $H_2O$ contaminants from it by the known means should be applied. The first approach is described in the U.S. Pat. No. 4,711,093, wherein methanol injection into HP gas stream upstream of the expander is used. However, several problems are inherent in this solution: an enhanced complexity of design and operation, consumption of fuel for regeneration of methanol from the aqueous methanol condensate and for heating of LP gas after recovery of its cold thermal energy, losses of methanol and NG from the system, and limitation of a bottom temperature level of cold thermal energy by −65÷−75° C. The second approach seems to be more suitable, since it makes possible to further lower a temperature level of the cold thermal energy of LP gas. However, the examples of using this cold in the LAES systems are unknown.

By and large the conducted analysis of the known technologies for recovering a waste energy of NG stream at the CG stations has not revealed any technical solutions using an extracted mechanical or electric power and cold for storing a power from the grid in general and for production of liquid air as a storable medium during off-peak hours in particular. The invented method offers such solution through a profitable integration of the LAES and CG stations; in doing so recovery of kinetic energy of the HP gas and cold thermal energy of the deeply cooled LP gas at the CC station provides a significant decrease in power consumed from the grid during charging the LAES facility. Here "deeply cooled LP natural gas" or "deeply cooled air" are to be understood to mean a gas or an air cooled down to and below −100° C.

SUMMARY OF THE INVENTION

In one or more embodiments, a proposed method for an energy storage may comprise in combination: a) charging an energy storage facility with a liquid air, as an energy storing medium, produced through consumption of a power from a grid and/or any co-located power plant; and b) reducing a pressure of a delivered natural gas at a co-located city gate station from a high pressure at the station inlet down to a low pressure at the station outlet with resulting production of a cooled low-pressure natural gas stream.

The invented method may differ from the known those in that: a) depressurizing the delivered natural gas at the co-located city gate station may be performed with producing a power which may be used for at least a partial meeting of a demand for said power consumed during charging the energy storage facility; and b) producing the cooled low-pressure natural gas stream at the co-located city gate station during charging the energy storage facility may be supplemented by simultaneous using a cold thermal energy of said cooled low-pressure natural gas stream for cooling an air being compressed during said production of the liquid air, resulting in reducing the energy storage facility demand for the power consumed.

In one or more embodiments, charging the energy storage facility with the liquid air may include the steps of: a) compressing an atmospheric air stream up to a bottom charge pressure using the power from the grid and/or any co-located power plant thus, forming a compressed atmospheric air stream; b) cleaning the compressed atmospheric air stream from the $CO_2$ and $H_2O$ contaminants thus, forming a compressed and cleaned atmospheric air stream; c) mixing the compressed and cleaned atmospheric air stream with a recirculating air stream at the bottom charge pressure thus, forming a process air stream; d) compressing said process air stream up to a rated charge pressure using the power from the grid and/or any co-located power plant; e) final compressing said process air stream up to a top charge pressure by at least one booster compressor driven by a cold turbo-expander operated between the top and bottom charge pressures; and f) further liquefying a lesser part of the process air stream at the bottom charge pressure and recirculating a major part of the process air stream via the cold turbo-expander for an assistance in liquefying said lesser part of the process air stream and for said mixing with the compressed and cleaned atmospheric air stream.

Charging the energy storage may be further characterized by: a) using the power produced at the co-located city gate station during said delivered natural gas depressurization as at least a part of the power required for compressing the atmospheric air stream and the process air stream; and b) cooling the recirculating air stream before said mixing with the compressed and cleaned atmospheric air stream through said using the cold thermal energy of the cooled low-pressure natural gas stream, resulting in reduction of the power consumed from the grid and/or any co-located power plant for compressing the process air.

In one or more embodiments, the delivered natural gas may be on-demand cleaned from a water vapor contaminant at the city gate station inlet.

In one or more embodiments, said depressurizing of the delivered natural gas at the co-located city gate station during charging the energy storage facility may include the steps of: a) pre-cooling the delivered natural gas thus, forming a pre-cooled natural gas stream; b) expanding the pre-cooled natural gas stream down to said low pressure, resulting in producing a power and forming a deeply cooled low-pressure natural gas; c) using the power produced during expansion of the pre-cooled natural gas stream as at least a part of the power required for compressing the atmospheric air stream and the process air stream at the energy storage facility; and d) successive using a cold thermal energy of the deeply cooled low-pressure natural gas stream for a deep cooling of the recirculating air stream before said mixing with the compressed and cleaned atmospheric air stream, following said pre-cooling of the delivered natural gas stream and lastly an intercooling of the process air stream upstream of said booster compressor.

BRIEF DESCRIPTION OF THE DRAWINGS

Embodiments will hereinafter be described in detail below with reference to the accompanying drawings, wherein lie reference numerals represent like elements. The accompanying drawing has not necessarily been drawn to scale. Where applicable, some features may not be illustrated to assist in the description of underlying features.

FIG. 1 is a schematic view of the first embodiment for implementing the charge of liquid air energy storage (LAES) facility with recovery of natural gas waste energy at the co-located city gate (CG) station, according to the present invention.

DETAILED DESCRIPTION OF THE INVENTION

The practical realization of the proposed method for an energy storage may be performed through the operational interaction between the LAES facility and co-located CG station. FIG. 1 shows schematically the first embodiment for implementing the charge of energy storage facility with recovery of natural gas waste energy at the co-located CG station. Here the involved equipment packages are designed as:

100—compressor train of the LAES facility.
200—turbo-expander and booster compressor train of the LAES facility.
300—liquefaction, separation and storage equipment of the LAES facility.
400—equipment package of the CG station.

According to the present invention, compressor train is designed as two-stage turbomachinery, wherein the first compression stage 102 and the second compression stage 106 are driven by the common electric motor 103. An atmospheric air is delivered through a pipe 101 into the first compression stage 102 and pressurized up to a bottom charge pressure. Train is equipped with intercooler 104 and inter-cleaner (adsorber) 105 for capture of moisture and carbon dioxide from a compressed atmospheric air. Removal of a compression heat in the intercooler 104 may be performed by an ambient air or water. At the outlet of adsorber (point 107) the compressed and cleaned atmospheric air is mixed with a recirculating air stream 315 delivered under the bottom charge pressure from a package 300 through a heat exchanger 406, so forming a process air stream 108. This process air stream is further compressed in the second compression stage 106 up to a rated pressure level. A deep cooling of the recirculating air stream 315 in the heat exchanger 406 leads to a drastic drop of the air temperature below −100° C., resulting in corresponding decrease in temperature of the mixed air stream 108 upstream of the compressor 106 and in reducing a power consumed by this compressor. Said deep cooling of the recirculating air is performed with a stream of the low-pressure natural gas produced at the city gate station, as described below. Removal of a compression heat from the process air leaving the compressor 106 with cooling this air down to 15° C.÷−30° C. is performed in the heat exchanger 109 by a stream of low-pressure natural gas escaping the city gate station, as also described below.

Further compressing the process air stream up to a top charge pressure is performed in the booster compressor 201 driven by the cold turbo-expander 202 with cooling the process air after said compressor in the heat exchanger 203. At a given ratio between the top and bottom charge pressures, the deeper is cooling the process air in the heat exchanger 109 and, correspondingly, at the inlet of booster compressor 201, the greater is a possible pressure ratio, which may be provided by this compressor without increase in power consumed by it. Correspondingly, this provides a possibility for some decrease in a pressure ratio in the compressor 106, resulting in a further reduction of the power consumed by it.

At the top charge pressure the aftercooled process air stream is delivered into a deep cooler 301, wherein its temperature decreased substantially below 0° C. with the recirculating air stream. The process air is further directed to the point 302, wherein it is divided into two streams 303 and 305. A major part of the process air (stream 303) is expanding down to the bottom charge pressure in the work-performing cold turbo-expander 202, resulting in a deep cooling of an expanded air stream 304. A lesser part of the process air (stream 305) is additionally cooled and fully liquefied with the recirculating air in an air liquefier 306. The liquefied process air is further directed into a generator-loaded turbine 307, wherein it is expanded down to the bottom charge pressure, resulting in final cooling of an expanded air down to a bottom charge temperature. The bottom charge pressure is selected at a level exceeding an atmospheric pressure by 1-7 bar. An air separator 308 installed at the outlet of expander 307 is used to separate the liquid and vapor phases of a finally expanded and cooled process air. The liquid air stream 309 is directed to the pressurized liquid air vessels 310, wherein liquid air is stored at the bottom charge pressure and temperature between the energy storage charge and discharge. The air vapor stream 311 is directed to the point 312, wherein it is mixed with the expanded and cooled part 304 of the process air. This results in formation of a recirculating air stream 313 at the bottom charge pressure and temperature. A cold thermal energy of said recirculating air stream 313 is further used for said additional cooling and liquefying the lesser part 305 of the process air in the air liquefier 306, resulting in heating an outgoing stream 314 of the recirculating air. The remainder of the cold thermal energy of said recirculating air stream 314 is further used for said cooling the process air in the deep cooler 301, resulting in further heating the outgoing stream 315 of the recirculating air up to 15-25° C. As mentioned above, to reduce the power consumed by the compressor train, the recirculating air stream 315 escaping the package 300 is deeply cooled in the heat exchanger 417 before mixing the recirculating air stream with the compressed and cleaned atmospheric air stream at the point 107.

Operation of the co-located CG station during charging the energy storage facility is run as follows. The stream of high pressure (HP) natural gas is delivered from the main pipeline through a pipe 401 into adsorber 402, wherein it is on-demand cleaned from the water vapor contaminants. The known Pressure-Swing Adsorption (PSA) technology is particularly suitable for these purposes, since the low pressure (LP) natural gas leaving the CG station may be used for purging the sorbent bed of the PSA adsorber. In the typical pipeline natural gas composition, a carbon dioxide content does not exceed 1%, whereas a minimal gas temperature at the proposed co-located CG station is above a temperature at which a solidification of the $CO_2$ in the gas stream may be started. Therefore, cleaning the delivered HP gas from the carbon dioxide is not required. The cleaned gas is subjected to pre-cooling in the heat exchanger 403 with a stream of natural gas escaping the city gate station and directed further to the cold turbo-expander 404 shaft-connected with the generator 405. Power produced by the cold-turbo-expander through recovery of the wasted gas pressure drop comprises from 50 to 100% of energy required for driving the compressor train, depending on the pressure ratio in the expander 404. In so doing, the electric motor 103 of compressor train takes its current from the generator 405 only or from the electric grid and generator 405 at one time. The expanding of gas down to a rated low pressure is accompanied by its deep cooling down to a bottom cycle temperature, at which gas is delivering to the said heat exchanger 406, wherein its cold thermal energy is used for a deep cooling of the recirculating air stream 315, as described above. The low-pressure gas escaping the heat exchanger 406 possesses a yet sufficient cold thermal energy to pre-cool the incoming stream of high-pressure gas in heat exchanger 403 and intercool the process air in the heat exchanger 109 between the second stage 106 of compressor train and the booster compressor 201. Resulting from a heat exchange in the said equipment, the stream of low-pressure gas 407 is delivered into a low-pressure main pipeline at a temperature equal to or exceeding a minim urn allowable value.

INDUSTRIAL APPLICABILITY

The performances of the charging process at the small-scale energy storage are presented below. The calculation of these performances has been performed as applied to integration between liquid air energy storage (LAES) facility and city gate (CG) station. The latter is exemplified by CG station designed for reducing a pressure of the ~43,000 m³/h of natural gas (assumed as 100% of methane) from 75 barA down to 15 barA (Alt.3), from 65 barA down to 7 barA (Alt.2) and from 25 barA down to 5 barA (Alt.3). During LAES charge the whole of obtained gas is delivered from the CG station into a low-pressure gas distribution pipeline, whereby mechanical energy of the expanded gas and its cold thermal energy are recovered at the LAES facility, drastically reducing consumption of power required for air liquefaction and consumed usually from the grid. In so doing it is possible to significantly increase a round-trip efficiency of the LAES.

In the conducted feasibility study it was assumed that the LAES facility is equipped with the equipment, providing storage charge with use of single turbo expander-compressor refrigeration cycle (see FIG. 1). Operation of the CG station is performed with use of one cold turbo-expander and a package of cold energy recovery equipment, as also shown in FIG. 1.

The given and assumed technical data used in numerical simulation of the energy storage performance are listed in the Table 1 below.

The main calculated performance of the integrated LAES facility and CG station during LAES charge are presented in the Table 2. Here the following designations are used: $G_{PA}$ and $G_{LA}$—flow-rates of process air and liquid air produced; $W_{FAC}$ and $W_{MAC}$—power consumed by

TABLE 1

| Parameter | Unit | Data |
|---|---|---|
| Feed air compressor polytropic & mechanical efficency | % | 85 |
| Main air compressor polytropic & mechanical efficency | % | 86 |
| Total expander adiabatic & mechanical efficiency | % | 85 |
| Total coupling & electric motor efficiency of turbomachinery | % | 97 |
| Isentropic liquid air expander efficiency | % | 85 |
| Isentropic liquid air pump efficiency | % | 80 |
| Small generator/motor electric efficiency | % | 96 |
| Compressor train outlet pressure | barA | 35-37 |
| Top charge pressure | barA | 61.7 |
| Bottom charge pressure | barA | 6.7 |
| Assumed pressure drop in piping | barA | 0 |
| Assumed pressure drop in each heat exchanger | barA | 0.025 |
| HP natural gas inlet pressure vs. selected Alternative | barA | 75-25 |
| LP natural gas outlet pressure vs. selected Alternative | barA | 15-5 | the feed and main air compressors; $W_{LAE}$—power produced by liquid air expander; $W_{LAES-CH}$—power consumed by the LAES facility; $ALR=(G_{LA}/G_{PA})\times100\%$—air liquefaction ratio; $G_{NG}$—flow-rate of natural gas (NG) delivered into CG station; $P_{HP}$—high pressure of gas delivered into CG station; $P_{LP}$—low pressure of gas escaping CG station; $W_{CTE}$—power produced by cold turbo-expander of the CG station; $W_{CH}=W_{LAES-CH}-W_{CTE}$—total electric power consumed from the grid during LAES charge; and $\omega_{CH}=W_{CH}/(G_{LA}\times3.6)$—specific grid power consumed for air liquefaction during LAES charge.

As may be seen from the data presented in the Table 2, the proposed integration of the LAES facility and CG station provides a drastic decrease in consumption of power from the grid during LAES charge at any selected gas pressure ratio ($\pi=P_{HP}/P_{LP}$) at the station and any selected inlet gas high pressure $P_{HP}$, at which natural gas enters the CG station. As was to be expected, a

TABLE 2

| Parameters | Unit | Alternative 1 | Alternative 2 | Alternative 3 |
|---|---|---|---|---|
| | | CITY GATE STATION | | |
| $P_{HP}$ | barA | 75 | 65 | 25 |
| $P_{LP}$ | barA | 15 | 7 | 5 |
| $G_{NG}$ | kg/s | 7.62 | 7.62 | 7.62 |
| $W_{CTE}$ | kWe | 745 | 1,081 | 764 |
| | | LAES FACILITY | | |
| $G_{PA}$ | kg/s | 6.58 | 6.58 | 6.58 |
| $G_{LA}$ | kg/s | 1.0 | 1.0 | 1.0 |
| $W_{FAC}$ | kWe | 275 | 275 | 275 |
| $W_{MAC}$ | kWe | 948 | 846 | 904 |
| $W_{LAE}$ | kWe | 9 | 9 | 9 |
| $W_{LAES-CH}$ | kWe | 1,215 | 1,113 | 1,170 |
| ALR | % | 15.2 | 15.2 | 15.2 |
| | | TOTAL CHARGE | | |
| $W_{CH}$ | kWe | 470 | 31 | 406 |
| $\omega_{CH}$ | kWh/ton | 131 | 9 | 113 | particularly sharp reduction in power consumed and correspondingly in the $W_{CH}$ and $\omega_{CH}$ values may be achieved at the $P_{HP}=65$ barA and greatest selected gas pressure ratio of $\pi=9.3$. The minimal value of $\omega_{CH}=9$ kWh/ton of liquid air attained in this case is several tens times less than that inherent in the conventional air liquefaction processes. Essentially this is to say that the LAES facility is transformed from a storage of the grid energy into storage of energy recovered at the CG station. However, most of the CG stations are using the lesser gas pressure ratio, allowing nonetheless the impressive reduction in $\omega_{CH}$ values to be attained. For example, at the $\pi=5$ the values of $\omega_{CH}=131$ and 113 kWh/ton may be gained for the $P_{HP}=75$ and 25 barA respectively.

As also evident from the Table 2, the CG stations with the higher values of the inlet gas pressure ($P_{HP}$) and pressure ratio ($\pi$) in the cold turbo-expanders are preferable for integration with the LAES facilities. These CG stations may be found in the large industrial zones or relatively small populated areas placed in the remote regions along the main pipeline of the HP natural gas.

It should be noted that the term "comprising" does not exclude other elements or steps and "a" or "an" do not exclude a plurality. It should also be noted that reference signs in the claims should not apparent to one of skill in the art that many changes and modifications can be effected to the above embodiments while remaining within the spirit and scope of the present invention.

What is claimed as new is:
1. A method for an energy storage, comprising in combination:
    charging an energy storage facility with a liquid air, as an energy storing medium, produced through consumption of a power from a grid and/or any co-located power source plant:
    reducing a pressure of a delivered natural gas at a co-located city gate station from a high pressure at a station inlet down to a low pressure at a station outlet with resulting production of a cooled low-pressure natural gas stream; and characterized in that:

depressurizing the delivered natural gas at the co-located city gate station is performed with producing a power which is used for at least a partial meeting of a demand for said power consumed during charging the energy storage facility; and producing the cooled low-pressure natural gas stream at the co-located city' gate station during charging the energy storage facility is supplemented by simultaneous using a cold thermal energy of said cooled low-pressure natural gas stream for cooling an air being compressed during said production of the liquid air resulting in reducing the energy storage facility demand for the power consumed.

2. The method as in claim 1, wherein said charging the energy storage facility with the liquid air includes the steps of:

a) compressing an atmospheric air stream up to a bottom charge pressure using the power from the grid and/or any co-located power plant thus, forming a compressed atmospheric air stream;

b) cleaning the compressed atmospheric air stream from the $CO_2$ and $H_2O$ contaminants thus, forming a compressed and cleaned atmospheric air stream;

c) mixing the compressed and cleaned atmospheric air stream with a recirculating air stream at the bottom charge pressure thus, forming a process air stream;

d) compressing said process air stream up to a rated charge pressure using the power from the grid and/or any co-located power plant;

e) final compressing said process air stream up to a top charge pressure by at least one booster compressor driven by a cold turbo-expander operated between the top and bottom charge pressures;

f) further liquefying a lesser part of the process air stream at the bottom charge pressure and recirculating a major part of the process air stream via the cold turbo-expander for an assistance in liquefying said lesser part of the process air stream and for said mixing with the compressed and cleaned atmospheric air stream; and is characterized by:

using the power produced at the co-located city gate station during said delivered natural gas depressurization as at least a part of the power required for compressing the atmospheric air stream and the process air stream; and using the cold thermal energy of the cooled low-pressure natural gas stream for a cooling of the recirculating air stream before said mixing with the compressed and cleaned atmospheric air stream, resulting in reduction of the power consumed from the grid and/or any co-located power plant for compressing the process air.

3. The method as in claim 1, wherein the delivered natural gas is on-demand cleaned from a water vapor contaminant at the station inlet.

4. The method as in claim 2, wherein said depressurizing of the delivered natural gas at the co-located city gate station during charging the energy storage facility includes the steps of:

a) pre-cooling the delivered natural gas thus, forming a pre-cooled natural gas stream;

b) expanding the pre-cooled natural gas stream down to said low pressure, resulting in producing a power and forming a deeply cooled low-pressure natural gas;

c) using the power produced during expansion of the pre-cooled natural gas stream as at least a part of the power required for compressing the atmospheric air stream and the process air stream at the energy storage facility; and d) successive using a cold thermal energy of the deeply cooled low-pressure natural gas stream for a deep cooling of the recirculating air stream before said mixing with the compressed and cleaned atmospheric air stream, following said pre-cooling of the delivered natural gas stream and lastly an intercooling of the process air stream upstream of said booster compressor.

* * * * *